(12) United States Patent
Maunders et al.

(10) Patent No.: US 11,907,427 B1
(45) Date of Patent: Feb. 20, 2024

(54) DISPLAY WITH LOCALIZED HAPTIC RESPONSE

(71) Applicant: FCA US LLC, Auburn Hills, MI (US)

(72) Inventors: Ross S Maunders, Harbor Springs, MI (US); Mark E Stout, II, Waterford, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/899,707

(22) Filed: Aug. 31, 2022

(51) Int. Cl.
*G06F 3/01* (2006.01)
*B60K 35/00* (2006.01)

(52) U.S. Cl.
CPC .............. *G06F 3/016* (2013.01); *B60K 35/00* (2013.01); *B60K 2370/1438* (2019.05); *B60K 2370/1446* (2019.05); *B60K 2370/158* (2019.05); *B60K 2370/91* (2019.05)

(58) Field of Classification Search
None
See application file for complete search history.

(56) References Cited

U.S. PATENT DOCUMENTS

| | | | |
|---|---|---|---|
| 7,973,769 B2 | 7/2011 | Olien | |
| 8,692,736 B1* | 4/2014 | Johnston | G06F 3/0483 345/107 |
| 9,123,258 B2 | 9/2015 | Makinen et al. | |
| 10,102,985 B1* | 10/2018 | Pelletier | H01H 13/06 |
| 10,437,336 B2 | 10/2019 | Hernandez Santisteband | |
| 10,475,358 B2* | 11/2019 | Peterson | G09F 13/005 |
| 10,942,571 B2 | 3/2021 | Hendren et al. | |
| 10,954,118 B2 | 3/2021 | Casset et al. | |
| 11,551,591 B2* | 1/2023 | Peterson | H05B 45/10 |
| 2011/0248916 A1* | 10/2011 | Griffin | G06F 3/0416 345/157 |
| 2012/0092272 A1* | 4/2012 | Miles | G06F 3/016 345/173 |
| 2012/0199132 A1* | 8/2012 | Ho | A61M 16/06 29/428 |
| 2014/0320435 A1* | 10/2014 | Modarres | G06F 1/1652 345/173 |
| 2016/0124509 A1* | 5/2016 | Garvis | G06F 3/0227 345/173 |
| 2016/0203742 A1* | 7/2016 | Peterson | H04N 23/60 362/23.19 |
| 2017/0349099 A1* | 12/2017 | Kunze | G02B 27/0101 |
| 2018/0348900 A1* | 12/2018 | Heinrich | G06F 3/0446 |
| 2021/0008434 A1* | 1/2021 | Swafford, Jr. | G09G 3/32 |
| 2021/0142700 A1* | 5/2021 | Peterson | H05B 45/10 |

FOREIGN PATENT DOCUMENTS

GB 2576219 A 2/2020
WO WO2021116249 A1 6/2021

* cited by examiner

*Primary Examiner* — Justin S Lee
(74) *Attorney, Agent, or Firm* — Jeremy J. Klobucar

(57) ABSTRACT

In at least some implementations, a screen assembly, includes a screen, an internal structure, an isolating material and an actuator. The screen has an outer surface and an input area, and the internal structure is behind the outer surface and defines part of a chamber behind the input area. The isolating material is within the chamber, and the actuator is behind the screen and arranged to provide haptic output to the input area. The isolating material damps the haptic output to reduce transmission of the haptic output to portions of the screen outside of the input area.

20 Claims, 2 Drawing Sheets

DISPLAY WITH LOCALIZED HAPTIC RESPONSE

FIELD

The present disclosure relates to a display screen including one or more regions with haptic feedback.

BACKGROUND

Some display screens include input areas from which menu options may be selected. Smooth, flat, touch screen displays are used in many applications, including automotive interiors. While attractive, it can be difficult for a user to determine which of multiple inputs may have been selected. This can be particularly problematic in a vehicle and distracting and annoying to occupants of a vehicle attempting to change various vehicle settings. Providing haptic feedback in such flat touch screen displays is difficult as the haptic feedback propagates through the display and can confuse a user as to which input actually was selected.

SUMMARY

In at least some implementations, a screen assembly, includes a screen, an internal structure, an isolating material and an actuator. The screen has an outer surface and an input area, and the internal structure is behind the outer surface and defines part of a chamber behind the input area. The isolating material is within the chamber, and the actuator is behind the screen and arranged to provide haptic output to the input area. The isolating material damps the haptic output to reduce transmission of the haptic output to portions of the screen outside of the input area.

In at least some implementations, the input area includes a thinner area of the screen. The thinner area may be defined by a recess formed in the outer surface of the screen. So arranged, the screen may close an end of the chamber.

In at least some implementations, the input area includes a button and the actuator is coupled to the button to provide the haptic output to the button. In at least some implementations, the screen includes an opening, the button is located behind the screen and the screen overlaps an upper surface of the button. In at least some implementations, the screen overlaps all of a side surface of the button that extends between the upper surface and a lower surface opposite to the upper surface. In at least some implementations, the button is received in the chamber and is movable independently of the screen.

In at least some implementations, the button overlaps part of the internal structure and a periphery of the button is received between the screen and the internal structure. In at least some implementations, the internal structure includes a bore and a counterbore, wherein the bore defines part of the chamber and the counterbore is larger than the bore and the button is received within the counterbore. In at least some implementations, the screen includes a counterbore surrounding the opening and the button is received within the counterbore.

In at least some implementations, wherein the isolating material has a hardness on Shore 000 Scale of between 0 and 60. The isolating material may be in contact with the screen outboard of the button or an opening or recess formed in the screen, to damp vibrations or other haptic output from the actuator in areas outboard of the button, opening or recess. This may facilitate user discernment of the input area, of multiple input areas, from which the haptic output is being provided.

In at least some implementations, a screen assembly, includes a screen, an internal structure, an isolating material and an actuator. The screen includes an outer surface and an input area. The internal structure is behind the outer surface and defines part of a chamber behind the input area, the internal structure arranged to support electronics operable to provide an image on the screen. The isolating material is within the chamber and engaged with the screen. And the actuator is behind the screen and arranged to provide haptic output to the input area. The isolating material damps the haptic output to reduce transmission of the haptic output to portions of the screen outside of the input area, and either: 1) the input area includes a thinner area of the screen; or 2) the input area includes a button, the screen includes an opening, and the button is located behind the screen and the screen overlaps an upper surface of the button.

In at least some implementations, the screen overlaps all of a side surface of the button that extends between the upper surface and a lower surface opposite to the upper surface.

In at least some implementations, the button is received in the chamber and is movable independently of the screen. In at least some implementations, the chamber is defined in part by a bore and a counterbore formed in one or both of the screen and the internal structure, and the counterbore is larger than the bore and the button is received within the counterbore. In at least some implementations, the counterbore is formed in either the screen or the internal structure. In at least some implementations, the isolating material has a hardness on Shore 000 Scale of between 0 and 60.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
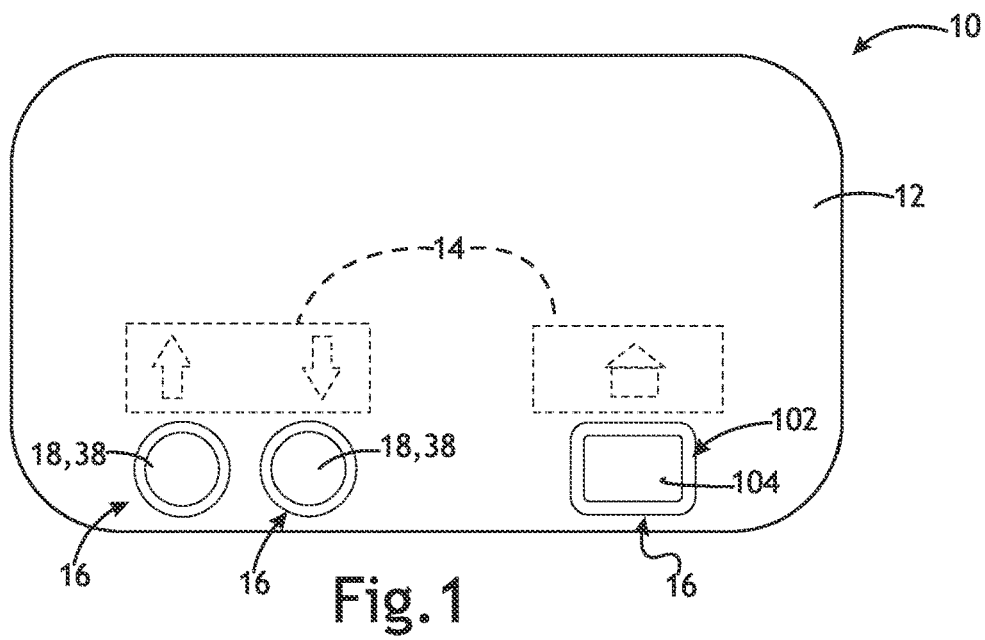
FIG. 1 is a plan view of a display screen including one or more input areas or buttons.

Referring in more detail to the drawings, FIG. 1 illustrates a display screen assembly 10 including a screen 12 via which information may be displayed for viewing. The information may include menu options 14 selectable by actuating one or more input areas 16 of the screen 12 which may include buttons 18 or other inputs. Such a screen 12 may be used, for example without limitation, in a vehicle to display information and permit users to change certain settings such as temperature, fan speed, music options, suspension or other vehicle settings, and the like. The buttons 18 or inputs/input areas 14 may be associated with a certain menu option 14, like increasing or decreasing volume, and actuation of one button causes an increase in sound system volume and actuation of a different button causes a decrease in sound system volume. The same buttons may be associated with different options in a different menu, for example to, respectively, increase and decrease fan speed in a heating/cooling menu, or by way of another non-limiting example, to select among different systems (e.g. music, HVAC, navigation, seat heaters/coolers, etc).

To facilitate use of the screen 12 and inputs 18, haptic feedback may be provided to indicate when an input has been actuated. To this end, an actuator 20 is associated with one or more of the input areas 16, and upon actuation of an input 18 in the input area, the actuator 20 vibrates or moves to provide haptic feedback to a user as confirmation that an input 18 has been actuated. In at least some implementations, each input 18 includes a separate actuator 20 that each provide feedback independently of the other actuators when an input 18 associated with an actuator 20 is actuated. In at least some implementations, the inputs 18 may include a switch that is actuated (e.g. changed between closed and open states) by depressing a portion of the screen 12, e.g. a button. The inputs 18 may include a touch responsive interface responsive to the touch or presence of a user's finger at the input area 16. Examples of touch screen technologies that may be used include, but are not necessarily limited to, resistive, capacitive (surface or projected), Surface Acoustic Wave or infrared.

Figure 2:
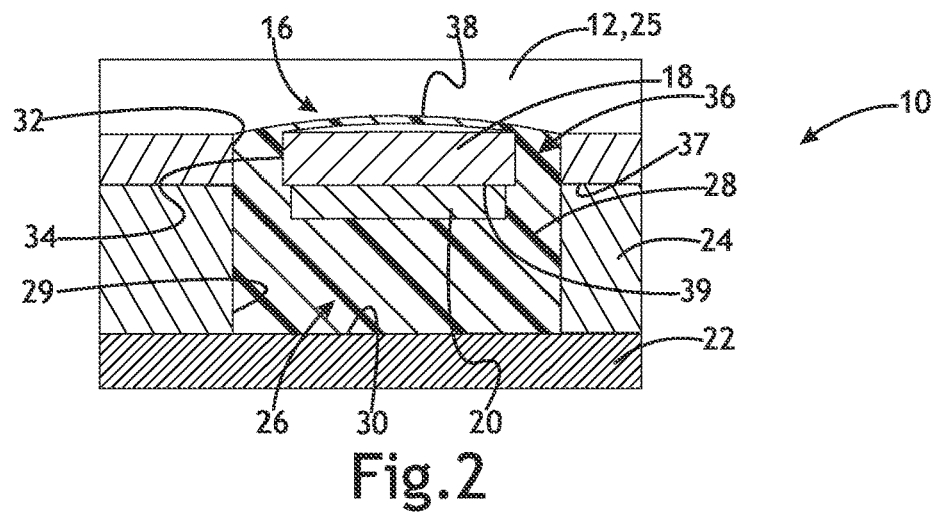
FIG. 2 is a partial sectional view of an input button.

In the example shown in FIG. 2, the screen 12 is part of an assembly 10 having a housing or outer frame 22 and an internal structure 24 that is located behind the screen 12 (i.e. on a side of the screen opposite an outer surface 25 which may be the display surface of the screen 12) and which may be received between the outer frame 22 and the screen 12. The internal structure 24 may be a single component or multiple structures including or receiving and retaining electronic componentry for the display screen 12. The layers of the display assembly 10 are diagrammatically shown in FIG. 2, and the screen 12 is shown as a single layer but could include multiple layers, including, for example, a protective layer of material or coating, as desired. One or more input areas 16 of the screen 12 are shown as including a chamber 26 formed in at least one layer, an isolating material 28 within the chamber 26, a button 18 within the chamber 26 and an actuator 20 coupled to the button 18.

The chamber 26 in FIG. 2 is defined at least in part by the screen 12 and by a void 29 the internal structure 24, and is closed at a bottom end 30, opposite to the screen 12, by the frame 22. The bottom end 30 of the chamber 26 could instead be defined by the internal structure 24 such that the chamber 26 does not extend to the frame 22, if desired. Opposite the bottom end 30, the chamber 26 may be open to or include an opening 32 through the screen 12, or a cover layer may be provided over the screen 12 (and optionally over the button 18) and enclosing at least part and up to all of the upper end of the chamber 26. In the example shown in FIG. 2, the button 18 has a circular periphery defined by a side surface 34 (extending between opposite upper and lower surfaces of 38, 39 the button), the opening 32 in the screen 12 also is circular and the void 29 in the internal structure 24 which may also be circular, and which may have the same diameter as the opening 32 in the screen 12.

The button 18 may be separate from the screen 12, with a space 36 provided between an inner surface 37 of the screen 12 that defines the opening 32 and the peripheral side surface 34 of the button. That is, the periphery of the button 18 is smaller than the size or diameter of the opening 32 in the screen 12. An upper, outer surface 38 of the button 18 may be arranged flush with the outer surface 25 of the screen 12, or it may be recessed slightly relative to the outer surface 25 of the screen 12, providing a recess or indentation that may be noticeable visually or by touch to a user to assist a user in positioning a finger over or on the button 18. The button 18 may be formed of any suitable material and may be soft and deformable (e.g. compressible) and resilient or firm with little to no compression when pressed for actuation. The button 18 may include a body with a switch or associated with a switch, or a sensor responsive to touch or being depressed or other sensing arrangement.

The actuator 20 may be any component that provides haptic feedback through the button 18, such as (but not limited to) a piezoelectric element, solenoid, transducer, eccentric rotating mass (ERM) or other motorized element, linear resonant actuator (LRA) or the like. The actuator 20 is shown as being coupled only to the button 18 and not to the screen 12 or internal structure 24, but the actuator 20 could be coupled to the screen or internal structure or frame 22, and operable to provide haptic feedback to the button 18, as desired.

The isolating material 28 is received within the chamber 26 and may contact one or both of the actuator 20 and the button 18, as well as the internal structure 24, and the screen 12, within the opening 32. The isolating material 28 damps (reduces the magnitude of) the haptic feedback so that the haptic feedback is most noticeable at the button 18 and not in areas of the screen 12 surrounding or adjacent to the button 18. This localizes the haptic feedback to better enable a user to determine which input area/button 18 has been actuated when multiple such inputs are provided. The isolating material 28 may surround at least part of the button 18, including the side surface 34 and in at least some implementations, does not overlap the upper surface 38 of the button 18.

The isolating material 28 may have a hardness on the Shore 000 Scale of between 0 and 60, and may be, for example, a liquid, optically clear adhesive that cures under UV light into a gelatinous consistency. One or both of the isolating material 28 and the button 18 may be transparent, if desired. The isolating material 28 may have a transmittance of between 85% and 100% @550 nm, measured by curing it between two TS297 Glass Specimens with a 405 nm LED @300 mW/cm$^2$ for 40 seconds. The materials may instead be opaque or translucent and/or of a color to, for example, match an adjacent area of the screen so that the input area 16 and button 18 appear more seamlessly with the remainder of the screen 12.

Figure 3:
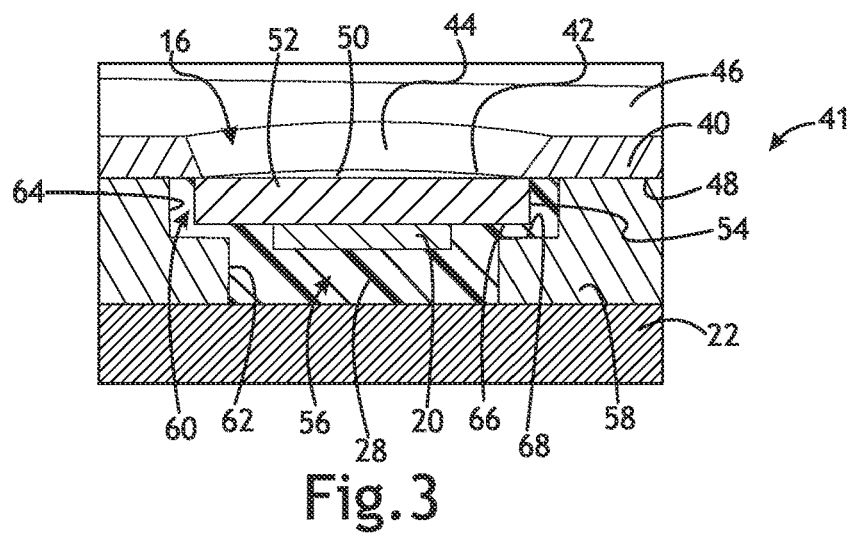
FIG. 3 is a partial sectional view of an input button.
Figure 4:
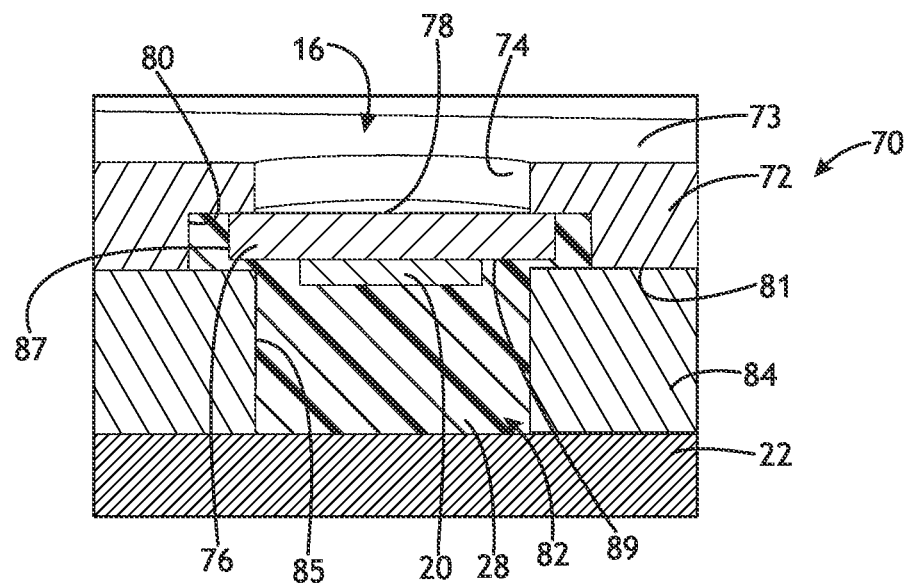
FIG. 4 is a partial sectional view of an input button.

In FIGS. 3 and 4, inlet areas of different displays are shown. This inlet areas may be very similar to the inlet area shown in FIG. 2, and the differences between them will be the primary focus of this description. Portions of the description of FIG. 2 are incorporated here to the extent not in contradiction with the examples shown in FIGS. 3 and 4, and described below.

The screen 40 (and related screen assembly 41) as shown in FIG. 3 includes an opening 42 defined by a beveled surface 44 arranged so that the opening 42 decreases in size from an outer surface 46 to an inner surface 48 of the layer(s) defining the screen 40, although the beveled surface 44 is not required. An upper surface 50 of the button 52 is larger than the opening 42 and at least part of the periphery of the button 52 is overlapped by the screen 40. In at least some implementations, the screen 40 overlaps the entire perimeter of the button 52 such that the side surface 54 of the button 52 is not visible when viewing the outer surface 46 of the screen 40.

At least part of a chamber 56 defined by the internal structure 58 of the display assembly 41, including the portion of the chamber 56 in which the button 52 is received, is larger than the opening 42 at the inner surface 48 and is larger than the button 42 so that there is a gap 60 between the side surface 54 of the button 52 and the internal structure 58. In the example shown, the internal structure 58 includes a bore 62 that extends therethrough and a counterbore 64 at the side adjacent to the button 52, with the counterbore 64 defining part of the space in which the button 52 is received. In this way, the upper surface 50 of the button 52 is overlapped by the screen 40 and the lower surface 66 of the button 52 is overlapped by the internal structure 58. The distance between the overlapping surfaces of the screen 40 and internal structure 58 (e.g. the inner surface 48 of the screen 40 and a bottom 68 of the counterbore 64) is greater than the thickness of the button 52 between its upper and lower surfaces 50, 66, to permit some movement of button 52 relative to the screen 40, to facilitate vibration or other haptic signal transmission via the button 52.

The actuator 20 may be coupled to or otherwise associated with the button 52, as described above with regard to the embodiment of FIG. 2. Isolating material 28 may be received within the chamber 56 and in engagement with the actuator 20 and/or the button 52. In the example shown, the isolating material 28 may surround the side surface 54 of the button 52, and may engage the inner surface 48 of the screen 40 outboard of the side surface 54 of the button 52.

In this way, the button 52 is received beneath the screen 40, and the opening 42 in the screen 40 provides a depression or recess having a bottom surface that is defined by the upper surface 50 of the button 52. The depression or recess is sized to be noticeable by touch and/or visually to the user, and may receive at least part of a user's fingertip to facilitate location of the button/input area and actuation of the button by a user.

The display screen assembly 70 and screen 72 in the example shown in FIG. 4 has an outer surface 73, a cylindrical opening 74 (e.g. not beveled) that is smaller than the button 76 so that part of the screen 72 overlaps the upper surface 78 of the button 76, similarly to the screen 40 and button 52 of FIG. 3. The screen 72 in FIG. 4 includes a counterbore 80 in inner surface 81 that provides an area of the chamber 82 that is larger than the button 76, to permit movement of the button 76 relative to the screen 72 for transmission of haptic feedback via the button 76. The portion of the chamber 82 formed in the internal structure 84 (e.g. by a void 85) may be smaller than the counterbore 80 (e.g. smaller diameter, width or other dimension) so that the button 76, including side surface 87 and lower surface 89, is overlapped on opposite sides by the screen 72 and the internal structure 84. To permit limit movement of the button 76 relative to the screen 72, the overlapping surfaces of the screen 72 and internal structure 84 are spaced apart a distance greater than the thickness of the button 76, as described above with regard to the example of FIG. 3. The actuator 20 and isolating material 28 may be similar to and arranged similarly as described above.

Figure 5:
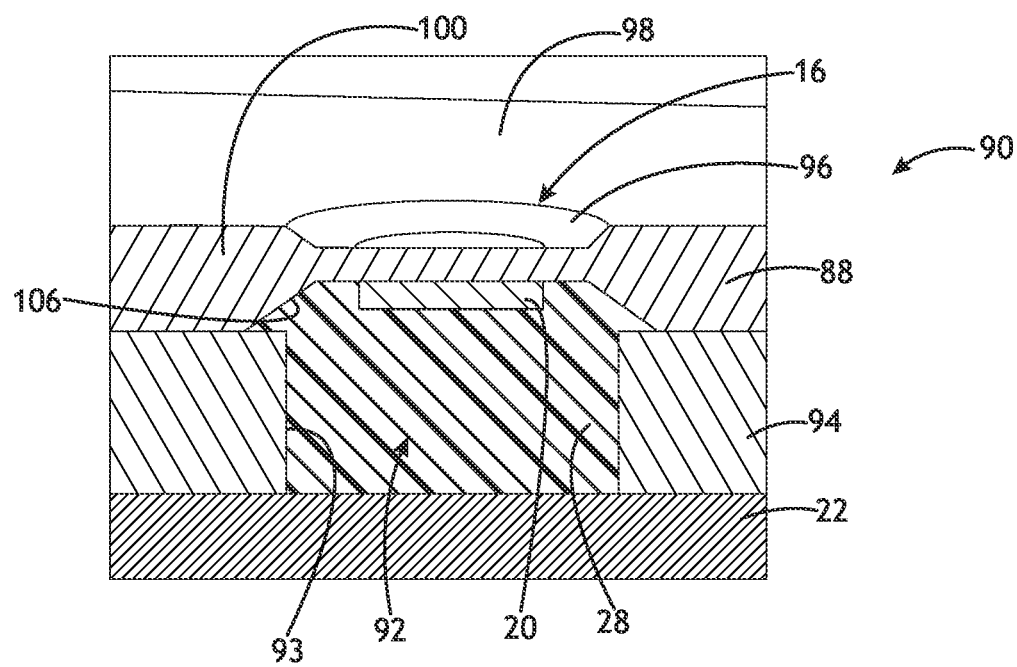
FIG. 5 is a partial sectional view of an input region of the display.

In FIG. 5, the actuator 20 is in contact with and may be directly coupled to the screen 88 of display screen assembly 90, such as the inner surface 91 of the screen 88, without a button that is separate from the screen 88 as in the other implementations shown in FIG. 2-4. The actuator 20 is received within a chamber 92 defined in part by a void 93 in the internal structure 94 and the screen 88 (and optionally the frame 22), and the isolating material 28 is within the chamber 92 and in contact with the actuator 20. Thus, the actuator 20 acts directly on an input area 16 of the screen 88, to provide haptic output to that input area 16 of the screen 88, and the isolating material 28 damps such haptic feedback so that the haptic feedback is less or not noticeable at other areas of the screen 88.

In at least some implementations, the screen 88 includes a cavity 96 formed in the outer surface 98 of the screen 88. The cavity 96 may provide an indentation visually and/or tactilely detectable by a user to facilitate user interaction with the input area 16. The cavity 96 may also define a thinner section of the screen 88 that may facilitate transmission of tactile output from the actuator 20 through the input area 16 of the screen 88, while the adjacent, thicker region 100 of the screen 88 also damps transmission of the haptic output to increase the localization of the haptic output.

While the examples of buttons and input areas shown in FIGS. 2-5 are circular, the buttons and areas may be of any desired shape, with a representative rounded rectangle shown at 102 in FIG. 1, with an inner region 104 thereof defined by a button (like the examples shown in FIGS. 2-4) or by the bottom of a cavity (like the example shown in FIG. 5) formed in the outer layer and/or screen. Within a screen assembly, the chamber is defined and the isolating material is received within the chamber and acting on one or both of an actuator and button. The actuator provides tactile output/feedback to an input area of the screen assembly and the isolating material damps the tactile output/feedback so that the output/feedback is less or not noticeable at other portions of the screen assembly, to facilitate notification to a user as to which input area has been actuated.

In at least some implementations, such as those shown in FIGS. 3 and 4, the isolating material 28 engages the screen 40, 72 (e.g. an inner surface 48, 81 of the screen) outside of the opening 42, 74 in the screen and may surround a periphery of the associated button 52, 78. This may permit the haptic feedback to be concentrated in the button 52, 78 and damped in the screen 40, 72 outside of the opening 42, 74 which may facilitate user determination of the input area 16 from which the haptic feedback is being provided. In screens having multiple input areas 16 near each other, such damping and localization of the haptic output of the actuator 20 can give the user confidence as to the input area that was actuated/selected and that the intended user command was entered to the desired input area. In the implementations shown in FIGS. 3 and 4, the counterbores 64, 80 are overlapped by part of the screen 40, 72 outside of the openings 42, 74 in the screen, and the isolating material 28 engages that part of the screen overlapping the counterbore (e.g. the periphery of the button and some isolating material are sandwiched between the overlapped portions of the screen and internal structure). The area of engagement of the isolating material 28 with the screen 40, 72 outside of the opening 42, 74 may be annular and entirely surrounding the opening. This may facilitate localizing the haptic feedback via the button and damp such haptic feedback outboard of the button and opening.

In the example of FIG. 5, the inner surface 91 of the screen 88 includes a void 106 (shown with an optionally tapered or inclined sidewall) that is larger than the cavity 96 formed in the outer surface 98 of the screen 88, and the portion of the chamber 92 formed in the internal structure 94 also is larger than the cavity 96. This arrangement enables the isolating material 28 to contact the screen's inner surface 91 in an area outside of the periphery of the cavity 96, and this area of engagement may be annular and completely surrounding the recess, if desired.

The layers of the screen assembly, including the internal structure/electronics frame and any base or outer housing, may be made of any desired materials, having any desired appearance (degree of transparency/translucency). In at least some implementations, the outer layer is made from a polycarbonate material that may, if desired, have a transparency similar to the isolating material as described above (e.g. 85% to 100% at 550 nm), and the button may be made from materials such as glass, acrylic or polycarbonate. If desired, the button can be similarly transparent/translucent to provide a more uniform screen in which the buttons blend in with the rest of the screen. When the buttons are transparent, the actuator may be coupled to the button by a transparent arm, with the actuator itself hidden behind an opaque of less transparent surface to hide the actuator from view.

What is claimed is:

1. A screen assembly, including:
a screen including an outer surface and an input area including multiple inputs;
an internal structure behind the outer surface and defining part of multiple chambers spaced apart behind the input area, wherein the multiple chambers are each defined by separate voids behind the input area and each of the multiple chambers is aligned with a respective one of the multiple inputs;
an isolating material within the multiple chambers; and
an actuator behind the screen and arranged to provide haptic output to the input area, wherein the actuator is electrically driven and associated with one of the multiple inputs, and the isolating material damps the haptic output to reduce transmission of the haptic output to portions of the screen outside of the area of said one of the multiple inputs.

2. The screen assembly of claim 1, wherein at least one of the multiple inputs of the input area includes an area of the screen that is thinner than adjacent areas of the screen.

3. The screen assembly of claim 2 wherein the area of the screen that is thinner than adjacent areas of the screen is defined by a recess formed in the outer surface of the screen.

4. The screen assembly of claim 1 wherein at least one of the inputs of the input area includes a button and the actuator is coupled to the button to provide the haptic output to the button.

5. The screen assembly of claim 4 wherein the screen includes an opening, the button is located behind the screen and wherein the screen overlaps an upper surface of the button.

6. The screen assembly of claim 5 wherein the screen overlaps all of a side surface of the button that extends between the upper surface and a lower surface opposite to the upper surface.

7. The screen assembly of claim 5 wherein the button is received in the chamber and is movable independently of the screen.

8. The screen assembly of claim 6 wherein the button overlaps part of the internal structure and a periphery of the button is received between the screen and the internal structure.

9. The screen assembly of claim 8 wherein the internal structure includes a bore and a counterbore, wherein the bore defines part of the chamber and the counterbore is larger than the bore and the button is received within the counterbore.

10. The screen assembly of claim 8 wherein the screen includes a counterbore surrounding the opening and the button is received within the counterbore.

11. The screen assembly of claim 1 wherein the isolating material has a hardness on Shore 000 Scale of between 0 and 60.

12. The screen assembly of claim 1 wherein the isolating material has a transmittance of between 85% and 100% at 550 nm.

13. A screen assembly, including:
a screen including an outer surface and an input area having an input that defines part of the input area;
an internal structure behind the outer surface and defining part of a chamber behind the input, the internal structure supporting electronics operable to provide an image on the screen;
an isolating material within the chamber and engaged with the input; and
an electrically driven actuator behind the screen and arranged to provide haptic output to the input, wherein the isolating material damps the haptic output to reduce transmission of the haptic output to portions of the screen outside of the input, wherein either: 1) the input includes an area of the screen that is thinner than adjacent areas of the screen; or 2) the input includes a button, the screen includes an opening, and the button is located behind the screen and the screen overlaps an upper surface of the button.

14. The screen assembly of claim 13 wherein the screen overlaps all of a side surface of the button that extends between the upper surface and a lower surface opposite to the upper surface.

15. The screen assembly of claim 13 wherein the button is received in the chamber and is movable independently of the screen.

16. A screen assembly, including:
a screen including an outer surface and an input area;
an internal structure behind the outer surface and defining part of a chamber behind the input area, the internal structure supporting electronics operable to provide an image on the screen;
an isolating material within the chamber and engaged with the screen; and
an actuator behind the screen and arranged to provide haptic output to the input area, wherein the isolating material damps the haptic output to reduce transmission of the haptic output to portions of the screen outside of the input area, wherein either: 1) the input area includes a thinner area of the screen; or 2) the input area includes a button, the screen includes an opening, and the button is located behind the screen and the screen overlaps an upper surface of the button, and wherein the screen overlaps all of a side surface of the button that extends between the upper surface and a lower surface opposite to the upper surface, and the chamber is defined in part by a bore and a counterbore formed in one or both of the screen and the internal structure, and the counterbore is larger than the bore and the button is received within the counterbore.

17. The screen assembly of claim 16 wherein the counterbore is formed in either the screen or the internal structure.

18. The screen assembly of claim 13 wherein the isolating material has a hardness on Shore 000 Scale of between 0 and 60.

19. The screen assembly of claim 13 wherein the actuator is coupled to the button.

20. The screen assembly of claim 13 wherein the isolating material is in contact with the actuator.

* * * * *